(12) United States Patent
Lee (10) Patent No.: US 7,773,156 B2
(45) Date of Patent: Aug. 10, 2010

(54) DEVICE AND METHOD FOR DISPLAYING PIP ON TV

(75) Inventor: Seung-jin Lee, Taegukwangyok-shi (KR)

(73) Assignee: LG Electronics Inc., Seoul (KR)

( * ) Notice: Subject to any disclaimer, the term of this patent is extended or adjusted under 35 U.S.C. 154(b) by 883 days.

(21) Appl. No.: 11/418,225

(22) Filed: May 5, 2006

(65) Prior Publication Data
US 2006/0227247 A1 Oct. 12, 2006

Related U.S. Application Data

(63) Continuation of application No. 10/468,266, filed as application No. PCT/KR02/00257 on Feb. 19, 2002, now abandoned.

(30) Foreign Application Priority Data

Feb. 20, 2001 (KR) .................. 10-2001-0008399

(51) Int. Cl.
*H04N 5/45* (2006.01)
*H04N 5/50* (2006.01)

(52) U.S. Cl. ...................... 348/565; 348/569

(58) Field of Classification Search ......... 348/563–565, 348/569, 584, 588, 589, 598, 600; *H04N 5/445, H04N 5/45, 5/50*
See application file for complete search history.

(56) References Cited

U.S. PATENT DOCUMENTS

| 5,565,929 A | 10/1996 | Tanaka |
| 6,563,547 B1 | 5/2003 | Smith |
| 6,753,928 B1 | 6/2004 | Gospel et al. |

FOREIGN PATENT DOCUMENTS

| CN | 1259827 | 7/2000 |
| EP | 0 560 593 A2 | 9/1993 |
| JP | 05-336398 | 12/1993 |
| JP | 7-162773 | 6/1995 |
| JP | 8-125941 | 5/1996 |

(Continued)

OTHER PUBLICATIONS

European Search Report dated Nov. 13, 2006.

(Continued)

*Primary Examiner*—Sherrie Hsia
(74) *Attorney, Agent, or Firm*—Ked & Associates, LLP (57) ABSTRACT

Device and method for displaying a PIP on a TV, the method including the steps of (a) generating a PIP if a user selects a PIP mode, generating menus for the generated PIP in a form of an OSD, displaying the generated PIP and PIP menus on the same time, (d) if a user desired menu is selected from the displayed menus, controlling according to the selected menu, and displaying the PIP and the PIP menu according to the control, whereby providing a variety for PIP window screens according to user's requirements owing to the simultaneous movement of the PIP screen and the PIP menu, and permitting the user to obtain desired information easily when the user identifies the picture source and selects the PIP, owing to the display of relevant source control information and PIP control information in a form of rim information, if the TV is used, with a variety of external devices connected thereto.

30 Claims, 12 Drawing Sheets

FOREIGN PATENT DOCUMENTS

| | | |
|---|---|---|
| JP | 10-294907 | 11/1998 |
| JP | 11-055593 | 2/1999 |
| JP | 11-150693 | 6/1999 |
| JP | 11-205670 | 7/1999 |
| JP | 2000-305543 | 11/2000 |
| KR | 1997-0078503 | 12/1997 |
| KR | 1999-0042395 | 6/1999 |
| KR | 2000-0057539 | 9/2000 |
| WO | WO 97/34413 | 9/1997 |
| WO | WO 99/21308 | 4/1999 |
| WO | WO 00/33570 | 6/2000 |

OTHER PUBLICATIONS

Chinese Office Action dated Mar. 2, 2007.
Japanese Notice of Allowance dated Feb. 5, 2008.

| volume UP/DOWN | △vol | ▽vol |
|---|---|---|
| channel UP/DOWN | △ch | ▽ch |
| reproduction | ▷ | fast forward | ▷▷ |
| fast re-winding | ◁◁ | stop | □ |
| ⚡ | main/sub exchange | ⊖ | full screen |

DEVICE AND METHOD FOR DISPLAYING PIP ON TV

This application is a continuation of U.S. application Ser. No. 10/468,266 filed Aug. 19, 2003, now abandoned which claims priority to PCT/KR02/00257, filed Feb. 19, 2002, published on Aug. 29, 2002, Publication No. WO 02/067581 A1 in the English language and which claimed priority to Korean Patent Application No. 2001/8399, filed Feb. 20, 2001. The contents of those documents are incorporated by reference herein.

BACKGROUND OF THE INVENTION

1. Field of the Invention

The present invention relates to a TV, and more particularly, to device and method for displaying a PIP on a TV.

2. Background of the Related Art

As TV technologies transit from analog systems to satellite broadcasting and digital broadcasting systems, technologies related to TV are developed rapidly with respect to quantity/quality. Particularly, with respect to quantity, it is foreseen that a number of TV broadcasting channels increase drastically by the digital system that facilitates operation of significantly many channels in comparison to the analog system, leading a user to experience difficulty, not only in using various channels only by simply knowing a few channels or names of broadcasting stations, but also watching a broadcasting program the user desires.

Therefore, recent TV technology requires provision of a broadcasting information guide function for displaying program information of each channel provided from a broadcasting station when the user desires so that the watcher knows and selects a broadcasting program easily, and development thereof for keeps pace with development of the broadcasting related technologies.

The PIP (picture in picture) function is a function for compressing a picture in vertical and horizontal directions, and displaying on a main picture, by using a channel the same with, or different from, the main picture, or by using an external picture.

The PIP function in the TV receiver is provided with functions of the PIP on/off, and PIP channel up/down, in addition to swap, main/sub-channel change-over, move, and move PIP to a new location, and the like, operative by keys assigned to a remote controller, mostly.

As explained, the related art TV receiver is provided with PIP means that permits the user to carry out only an extent of functions to select a menu the user desires, but can not satisfy a variety of user's requirements.

As a central media of a home, the TV receiver is required to make connection to various external appliances (VCR, VIDEO, DVD, - - - ), and required to display in forms of PIP or multiple screens for displaying various sources on the same time.

However, in the display, there are problems in that the watcher is required to make a direct control of the appliances for controlling a picture source after the picture source is identified, and exact identification of source appliances of pictures are required when pictures from a plurality of external appliances are displayed on the same time.

The above references are incorporated by reference herein where appropriate for appropriate teachings of additional or alternative details, features and/or technical background.

DISCLOSURE OF THE INVENTION

Accordingly, the present invention is directed to device and method for displaying PIP on a TV that substantially obviates one or more of the problems due to limitations and disadvantages of the related art.

An object of the present invention is to provide device and method for displaying PIP on a TV, in which PIPs and PIP menus can be re-located, or varied on the same time as the user requires.

An objection of the present invention is to provide device and method for displaying PIP on a TV, in which sources of received pictures are identified, and source control information and PIP control information on respective picture sources are stored, for displaying PIPs, together with rim information on the sources of the received pictures.

Additional features and advantages of the invention will be set forth in part in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantage and in accordance with the purpose of the present invention, as embodied and broadly described, the device for displaying a PIP on a TV having an interfacing part and a displaying part, includes a first picture processing part for receiving and processing a picture signal to be displayed on a main screen, a second picture processing part for receiving and processing a picture signal to be displayed on a PIP, a microcomputer for controlling so that outputs of the first picture processing part, and the second picture processing part, and PIP menu information stored already are displayed on the displaying part in a form a user desires, and a digital picture processing part for processing a picture signal from the switching part and a PIP menu produced when the PIP mode is selected in response to a control signal from the microcomputer for displaying on the displaying part.

In another aspect of the present invention, there is provided a method for displaying a PIP on a TV, including the steps of (a) generating a PIP if a user selects a PIP mode, generating menus for the generated PIP in a form of an OSD, displaying the generated PIP and PIP menus on the same time, (d) if a user desired menu is selected from the displayed menus, controlling according to the selected menu, and displaying the PIP and the PIP menu according to the control.

In further aspect of the present invention, there is provided a device for displaying a PIP on a TV having an interfacing part and a displaying part, including a first picture processing part for receiving and processing a picture signal to be displayed on a main screen, a second picture processing part for receiving and processing a picture signal to be displayed on a sub-screen, a superimposing part for superimposing picture signals from the first picture processing part and the second picture processing part, a rim information providing part for providing source control information and PIP control information on the received picture signal in the form of a rim, a microcomputer for identifying a source of the received picture signal, extracting the rim information to be displayed in the PIP from the rim information providing part, and displaying the rim information when the user selects the PIP menu, and controlling system operation according to a user's requirement command, a switching part for selective presentation of the superimposed picture signal fro the superimposing part and the rim information from the rim information providing part, and a displaying part for displaying an output of the switching part.

In still further aspect of the present invention, there is provided a method for displaying a PIP on a TV, including the steps of (a) identifying a source of the received picture signal, if the user selects a PIP mode, (b) selecting rim information according to the identified source, (c) setting a size and a position of the PIP, and (d) displaying the main screen picture signal, and the PIP according to the set size and position of the PIP.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Figure 1:
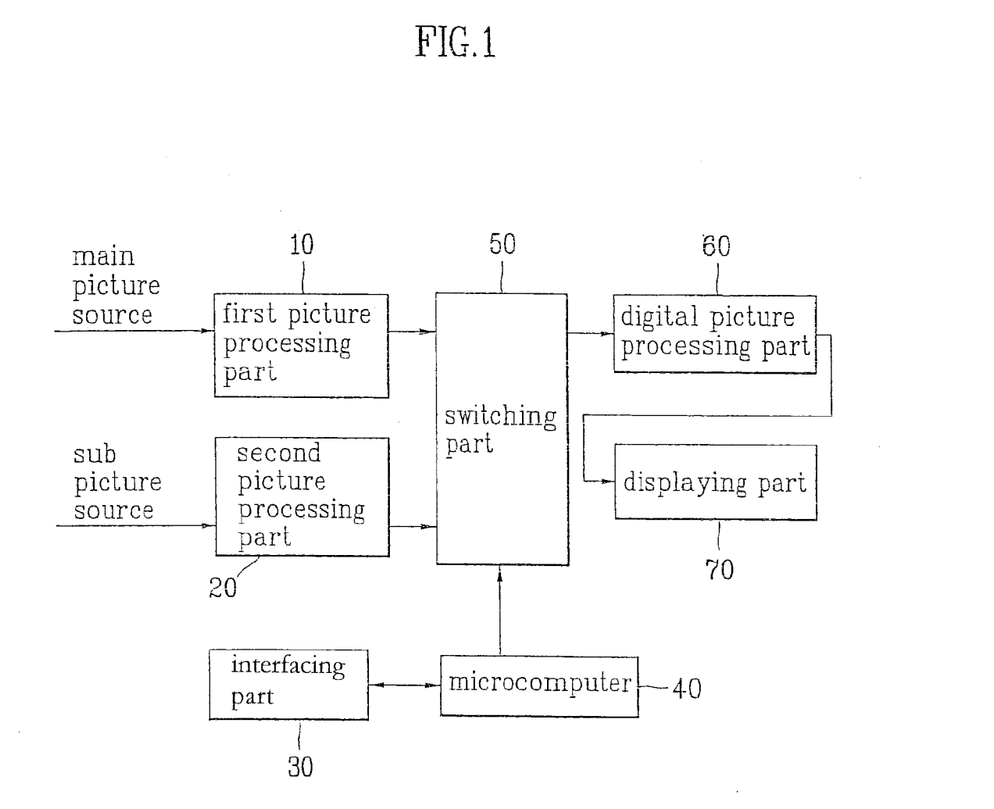
FIG. 1 illustrates a block diagram showing a device for displaying PIP on a TV in accordance with a preferred embodiment of the present invention.

Reference will now be made in detail to the preferred embodiments of the present invention, examples of which are illustrated in the accompanying drawings. FIG. 1 illustrates a block diagram showing a device for displaying PIP on a TV in accordance with a preferred embodiment of the present invention, FIGS. 2A-2B illustrate TV screens each with different PIP in accordance with a preferred embodiment of the present invention, and FIG. 3 illustrates a flow chart showing the steps of a method for displaying PIP on a TV in accordance with a preferred embodiment of the present invention.

The device for displaying PIP on a TV in accordance with a preferred embodiment of the present invention includes a first picture processing part 10 for receiving and processing a picture signal to be displayed on a main screen, a second picture processing part 20 for receiving and processing a picture signal to be displayed on a sub-screen, an interfering part 30 for connection to user requirement signals and external appliances, a switching part 50 for selecting outputs of the first picture processing part 10 and the second picture processing part 20 according to user requirement command received through the interfacing part 30, a digital picture processing part 60 for processing a signal from the switching part for displaying on a displaying part 70, and a microcomputer 40 for controlling a composition of the picture signals from the first picture processing part 10 and the second picture processing part 20 according to a command from the user received from the interfacing part 30, and configuration of the PIP according to a PIP control command from the user.

Figure 2A:
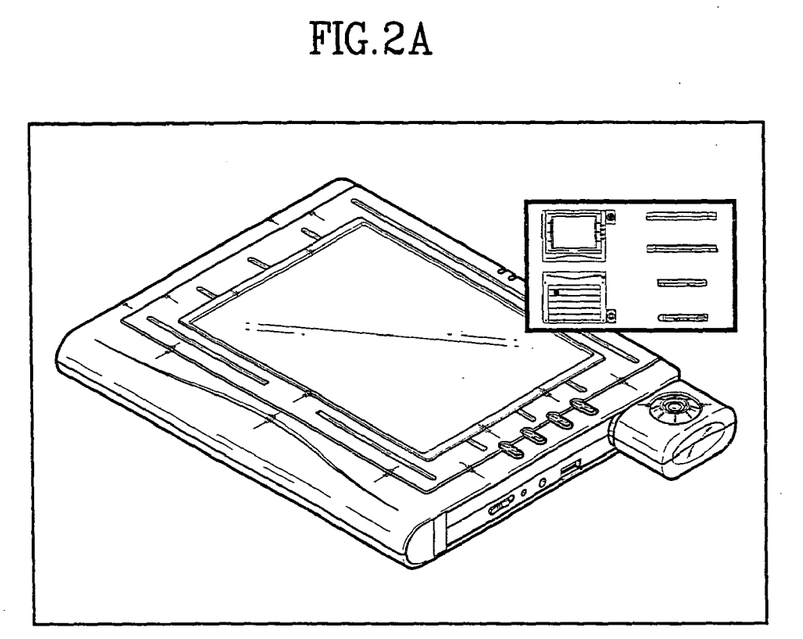
FIGS. 2A-2C illustrate TV screens each with different PIP in accordance with a preferred embodiment of the present invention.
Figure 2B:
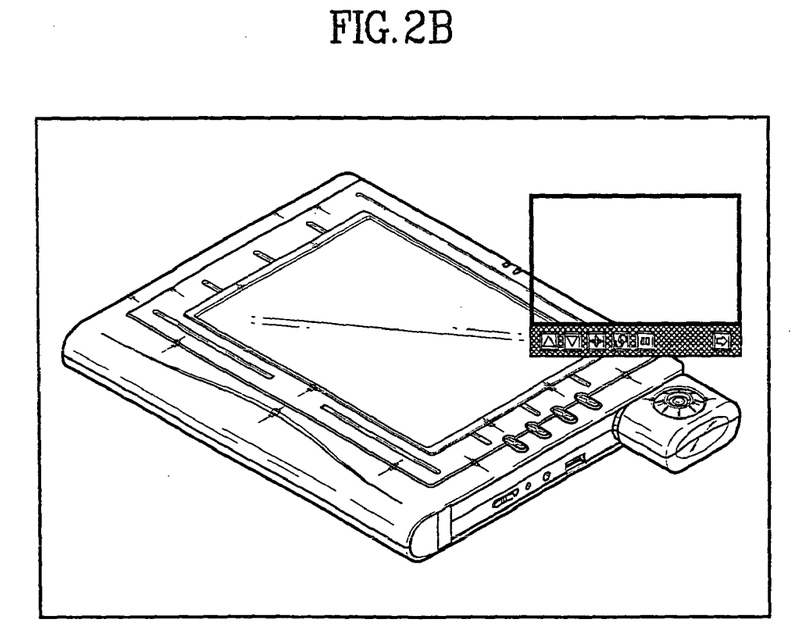
Figure 3:
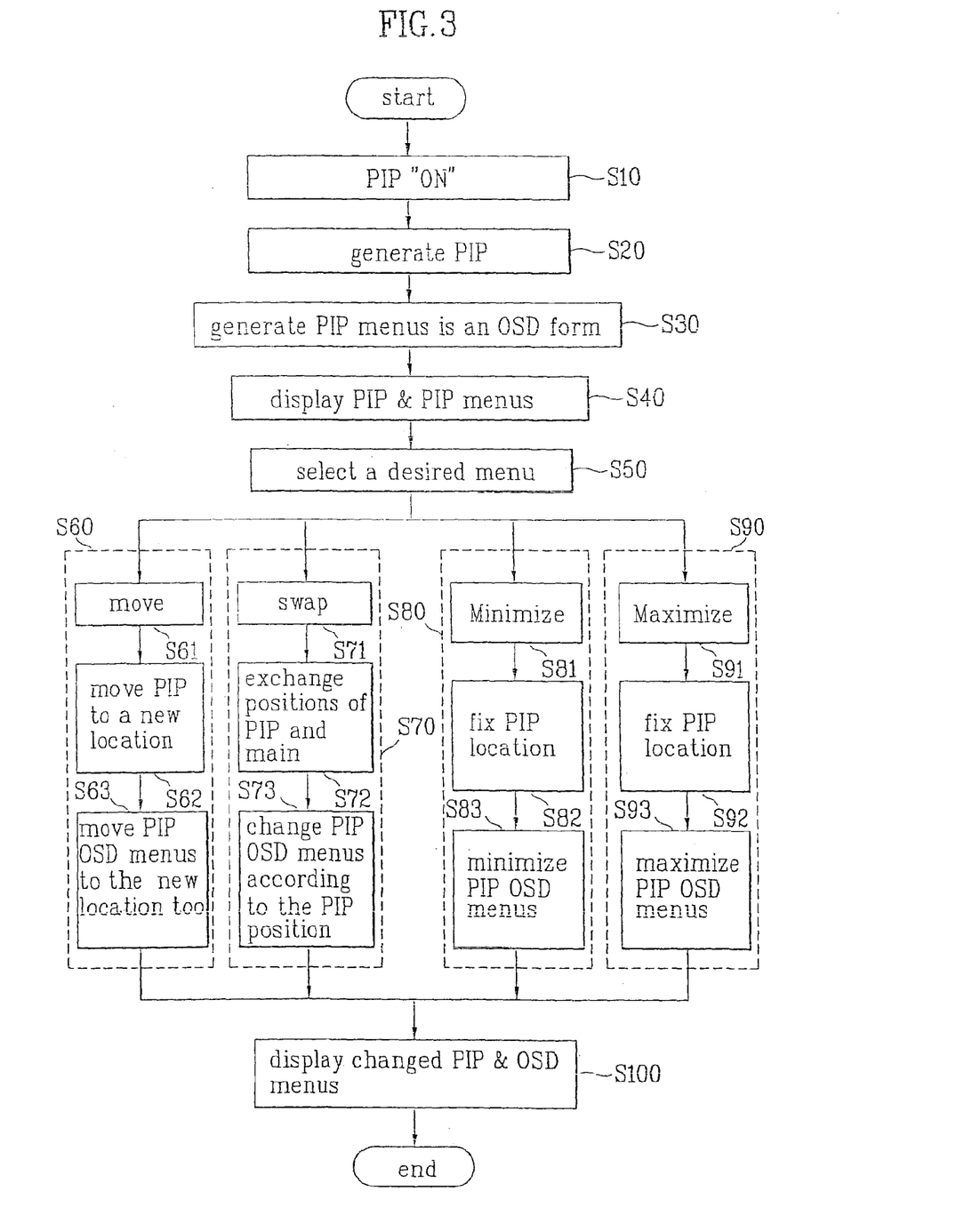
FIG. 3 illustrates a flow chart showing the steps of a method for displaying PIP on a TV in accordance with a preferred embodiment of the present invention.

In the PIP configuration, only the PIP may be displayed as shown in FIG. 2A, only OSD of the PIP may be displayed as shown in FIG. 2B, or the PIP may be displayed, together with PIP menus.

Figure 2C:
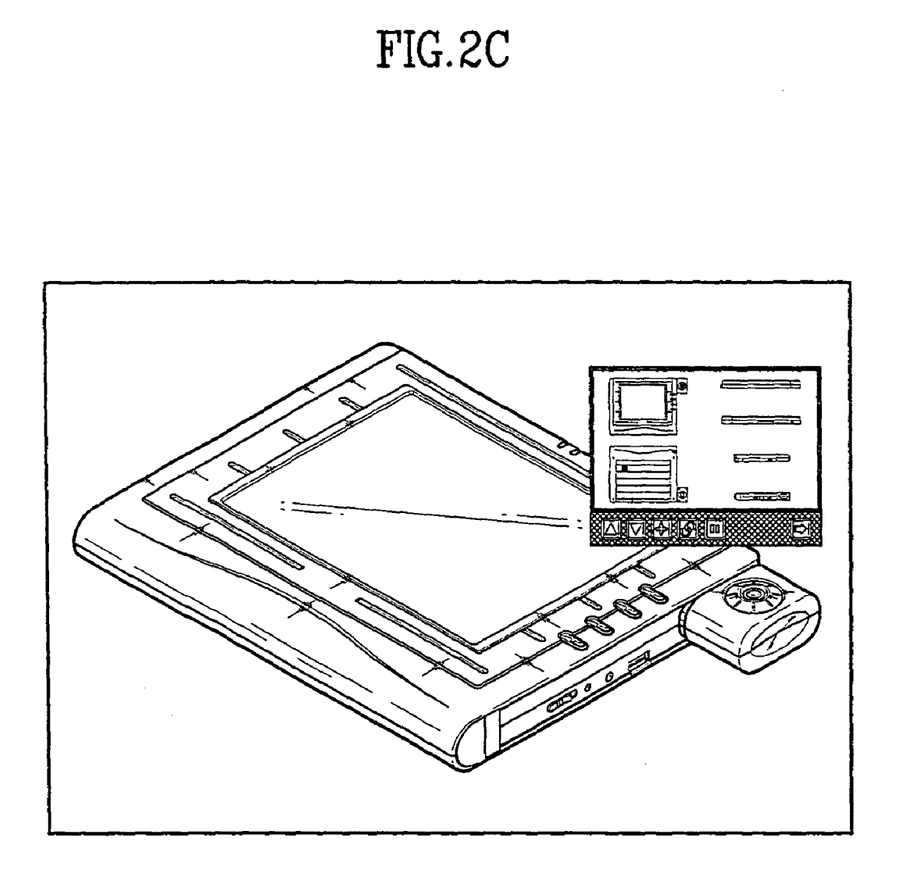

That is, if it is intended to combine PIP menus fixed at a location with the present PIP and display on the screen, it is required to provide the PIP menus on coordinates where the PIP is located as shown in FIG. 2B, and make a central part clear to exhibit the PIP screen. A form of rim may be varied by using bit map, to exhibit a picture as shown in FIG. 2C, finally.

A method for displaying a PIP on a TV of the present invention will be explained, with reference to FIG. 3.

When the user turns on a PIP mode, a PIP is generated (S10-S20). An OSD form of menus of the generated PIP is generated (S30). The PIP and the generated PIP menus are displayed (S40). A menu the user desires is selected from the displayed menus (S50). When the user selects move menu from the menus, a required process is carried out to move a location of the PIP (S60). In this instance, if the move menu is selected, the locations of the PIP as well as the PIP menus are moved (S61-S63). If the user selects a swap menu from the menus, positions of the main picture and the PIP are exchanged, in the display (S70). When the swap menu is selected, the PIP menus are also moved along the PIP location after the exchange of positions of the PIP and the main picture (S71-S73). If the user selects a minimize form the menus, the location of the PIP is fixed, and the OSD of the PIP menus is minimized (S80). Once the minimize menu is selected, location of the PIP is fixed, and only the PIP menus are minimized (S81-S83). If the user selects a maximize menu form the menus, the PIP and the PIP menu OSD is maximized (S90). If the maximize is selected, the PIP menus are maximized under a state the location of the PIP is fixed (S91-S93). The PIP and the PIP menus changed thus are displayed (S100).

Figure 4A:
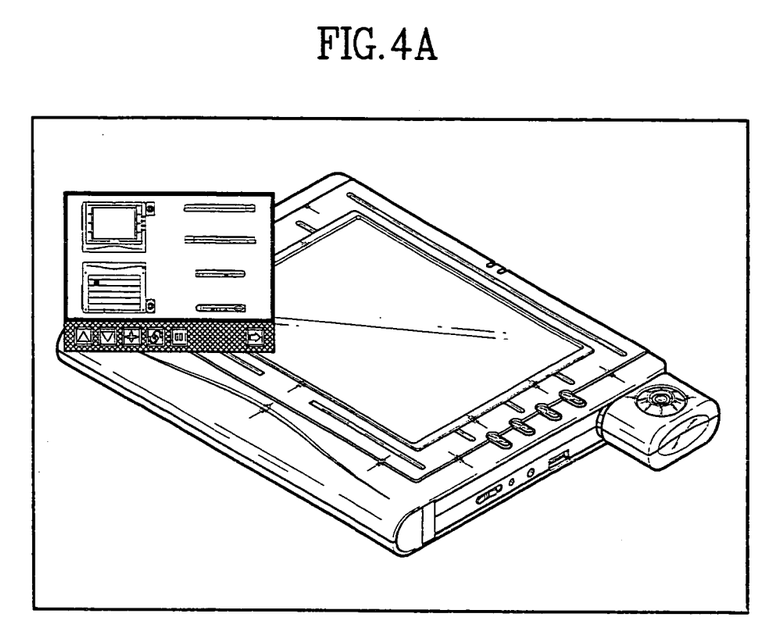
FIGS. 4A-4D illustrate examples of a method for displaying PIP on a TV of the present invention.
Figure 4B:
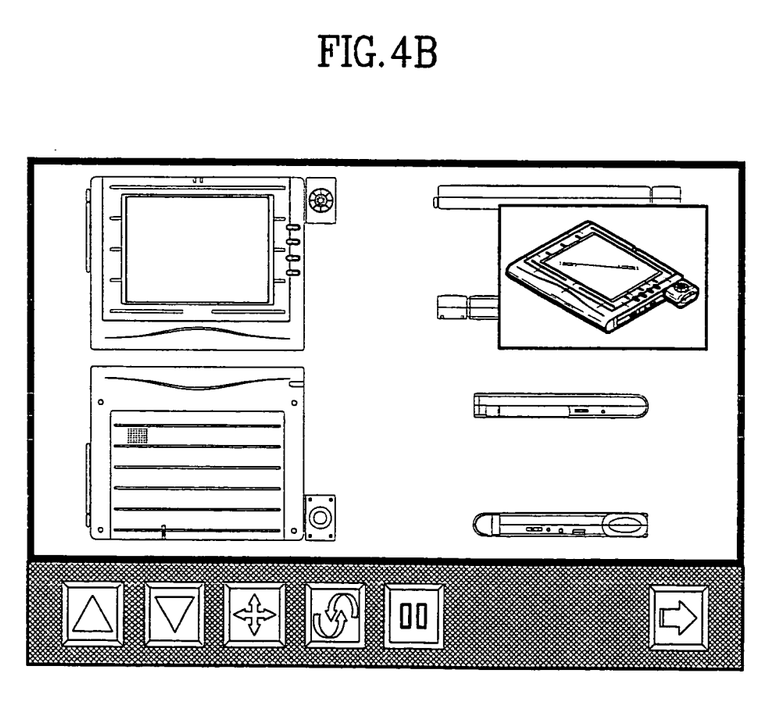
Figure 4C:
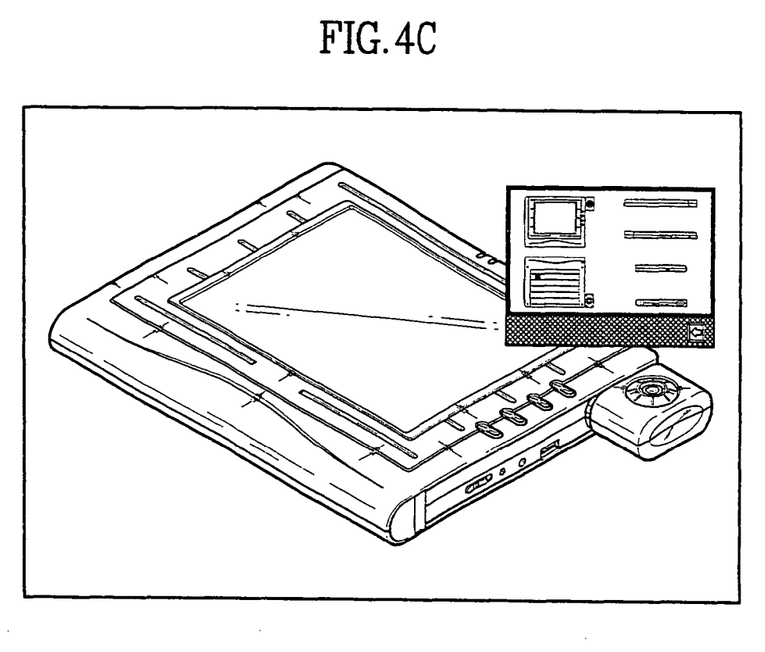
Figure 4D:
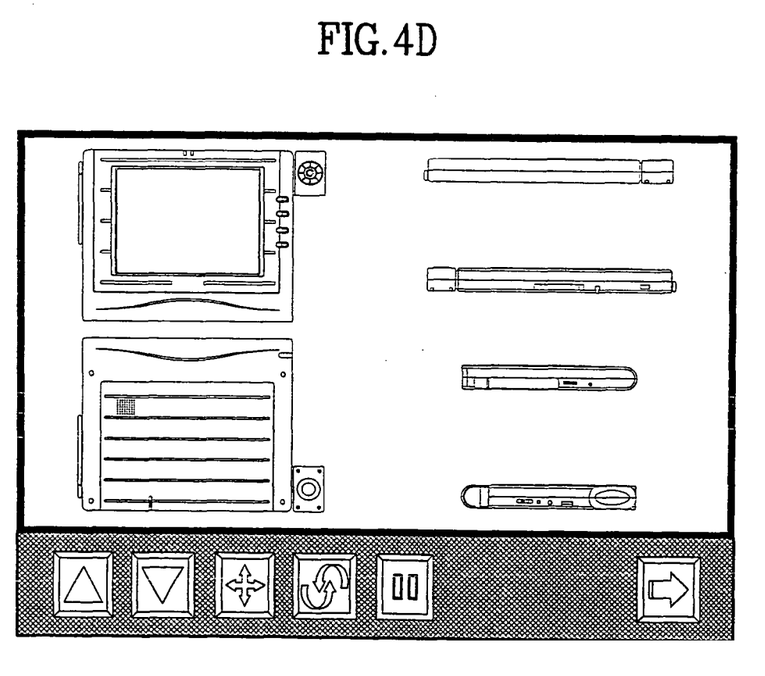

As described, once the user selects the move menu from the PIP menus, the PIP and the PIP menus can be moved as the user desires as shown in FIG. 4A. If the user selects the swap menu form the PIP menus, positions of the main picture and the PIP picture are exchanged as shown in FIG. 4B, to move the PIP and the PIP menu to the main picture position and the main picture of the PIP position. When the user selects the minimize menu from the PIP menus, the PIP does not move to a new location, but only the PIP menus are minimized as shown in FIG. 4C. Lastly, if the user selects the maximize menu from the PIP menu, the main picture is erased, and the PIP and the PIP menu are displayed on the main screen, fully.

Embodiment

Another embodiment of the device and method for displaying a PIP on a TV of the present invention will be explained with reference to the attached drawings 5-8.

Figure 5:
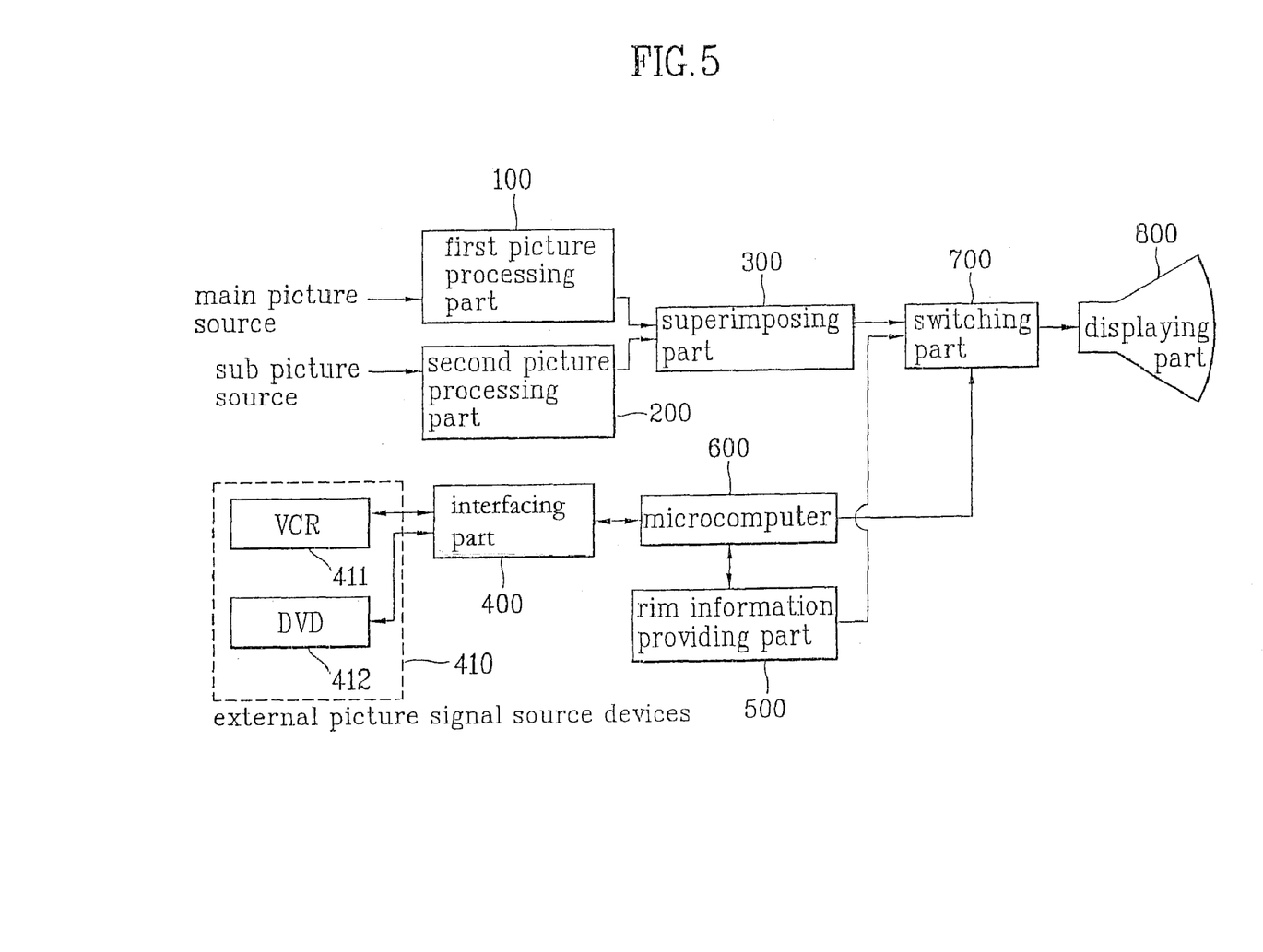
FIG. 5 illustrates a block diagram of a device for displaying PIP on a TV in accordance with a first preferred embodiment of the present invention.

Referring to FIG. 5, the device for displaying a PIP on a TV in accordance with another preferred embodiment of the present invention includes a first picture processing part 100 for receiving and processing a picture signal to be displayed on a main screen, a second picture processing part 200 for receiving and processing a picture signal to be displayed on a sub-screen, a superimposing part for superimposing picture signals from the first picture processing part 100 and the second picture processing part 200, an interfacing part 400, external picture signal source devices 410 each operative in response to a control signal received through the interfacing part 400, a rim information providing part 500 for providing source control information and PIP control information on the received picture signal in a form of rim, a microcomputer 600 for identifying a source of the received picture signal, extracting the rim information to be displayed in the PIP from the rim information providing part 500, and displaying the rim information when the user selects the PIP menu, and controlling operation of a system according to a user's requirement command, a switching part 700 for selective presentation of the superimposed picture signal from the superimposing part 300 and the rim information from the rim information providing part 500, and a displaying part 800 for displaying the switching part 700. The external source devices 410 are a VCR 411, a DVD 412, and the like that can provide the picture signal.

Figure 6:
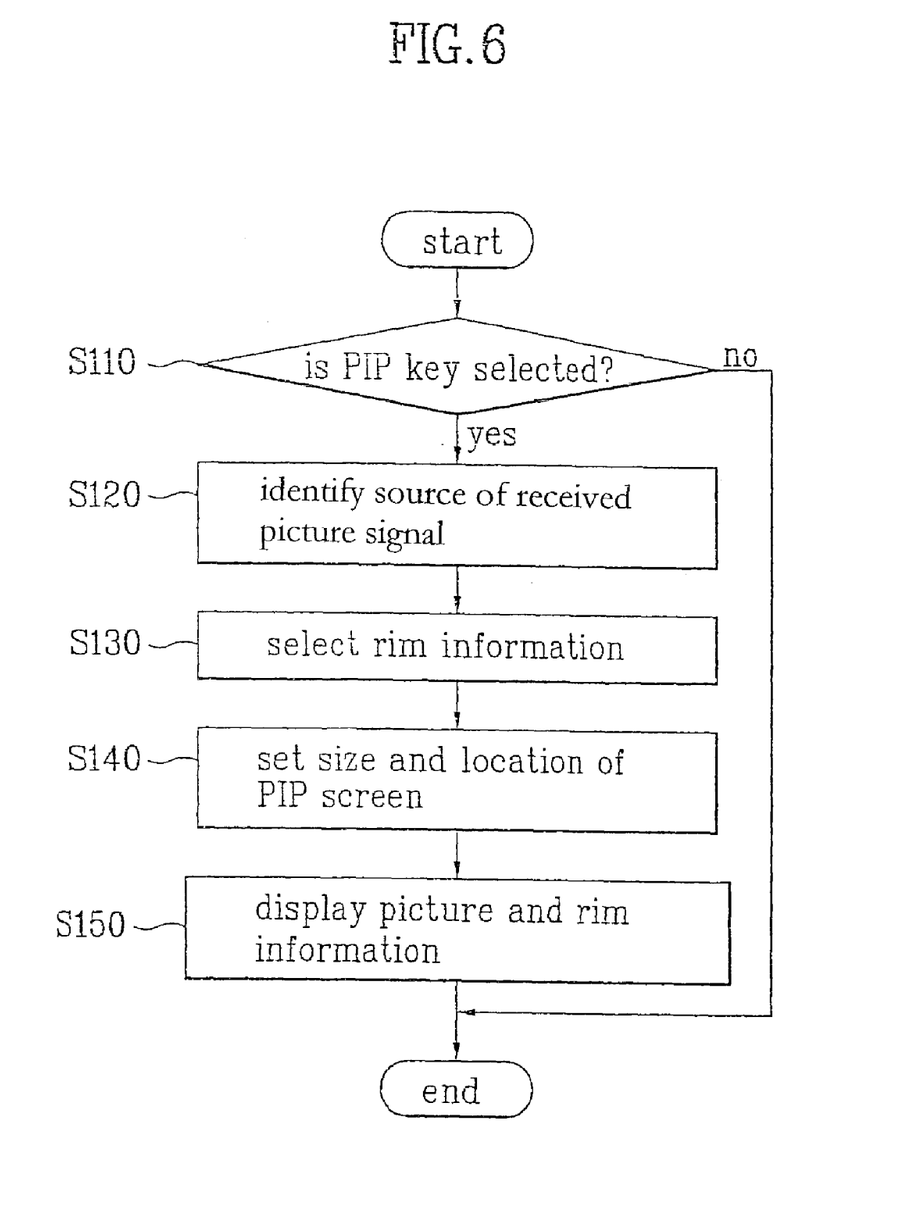
FIG. 6 illustrates a flow chart showing the steps of a method for displaying PIP on a TV in accordance with a preferred embodiment of the present invention.

The operation of the device for displaying PIP on a TV in accordance with a preferred embodiment of the present invention will be explained, with reference to FIG. 6.

User's selection of the PIP mode is determined (S110). If the user selects the PIP mode as a result of the determination (S110), a source of the received picture signal is identified (S120), and rim information is selected according to the identified source (S130). Then, a size and a position of the PIP the user desires are selected (S140). The main screen picture signal, the PIP, and the rim information for indicating source control information to be displayed on the PIP, are displayed at required locations (S150). The rim information includes source control information, PIP control information for controlling the PIP, and source identifying information for identifying the source.

The rim information will be explained, with reference to the following table.

TABLE 1

| Description | No. | TV | VIDEO | DVD |
|---|---|---|---|---|
| Source Control | 1 | CH Up | Stop | Stop |
|  | 2 | CH Down | Reproduce | Reproduce |
|  | 3 | Volume Up | Fast Forward | Fast Forward |
|  | 4 | Volume Down | Re-wind | Re-wind |
|  | 5 |  | Volume Up/Down | Volume Up/Down |
|  | 6 |  | CH Up/Down | CH Up/Down |
| PIP Control | 7 | Main/Sub Exchange | Main/Sub Exchange | Main/Sub Exchange |
|  | 8 | Picture Size Enlarge/Reduce | Picture Size Enlarge/Reduce | Picture Size Enlarge/Reduce |
|  | 9 | Move to a new location | Move to a new location | Move to a new location |

As shown in Table 1, the TV picture signal, the video picture signal, or the DVD picture signal is divided into information for controlling the source, and information for controlling the PIP.

Figure 7A:
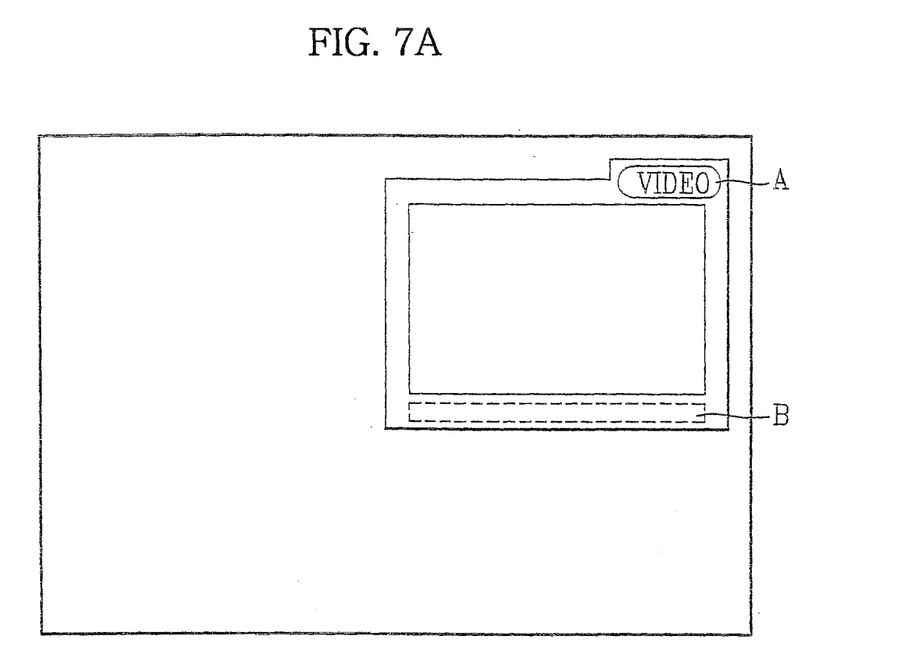
FIGS. 7A-7E illustrate drawings showing the steps of a method for displaying PIP on a TV in accordance with a preferred embodiment of the present invention.
Figure 7B:
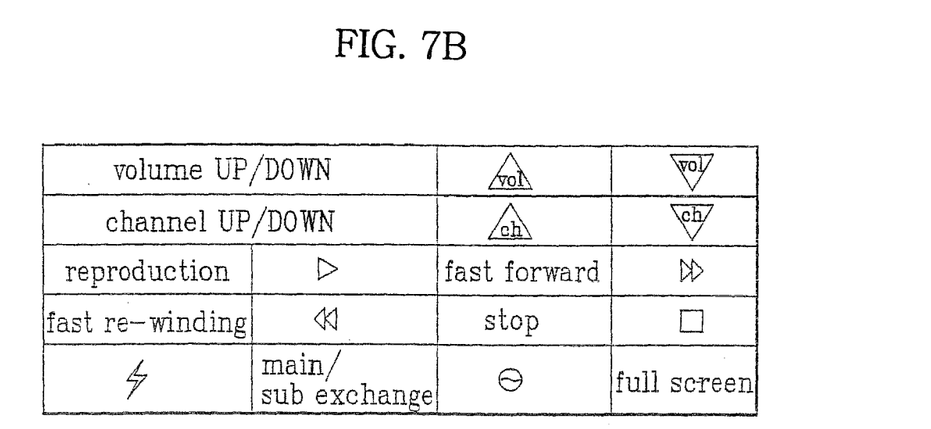
Figure 7C:
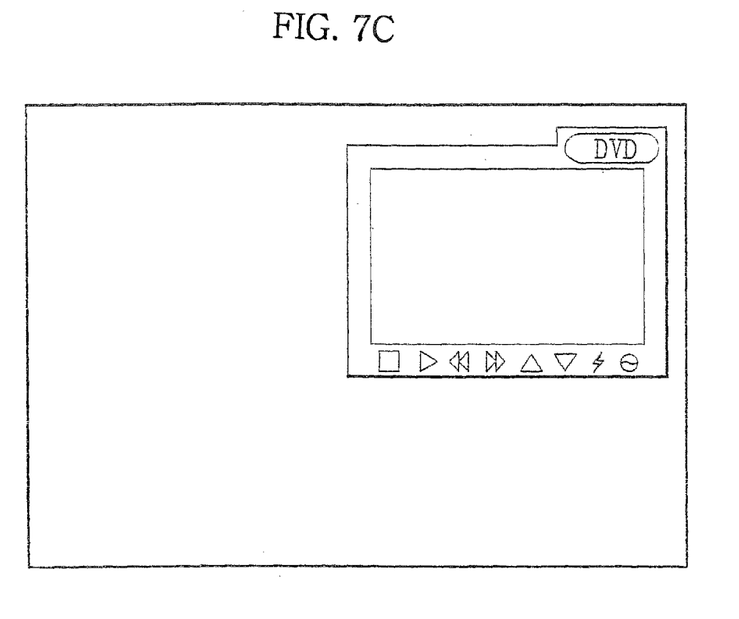
Figure 7D:
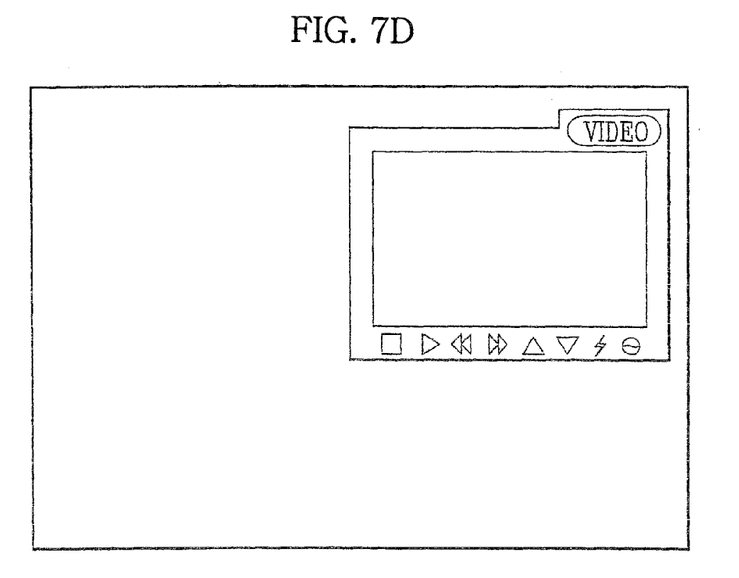
Figure 7E:
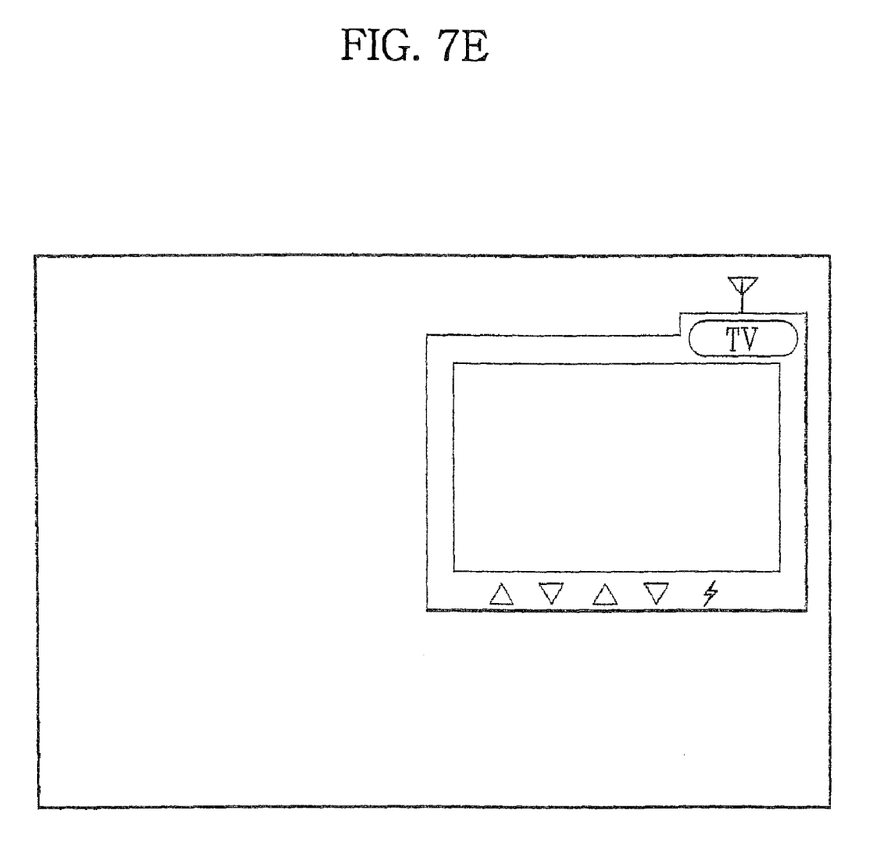

Therefore, when the user selects the PIP menu, the PIP as shown in FIG. 7A is displayed, wherein 'A' region displays a source of the received picture, and 'B' region displays the rim information of the source in a form of icons as shown in FIG. 7B. That is, as shown in FIG. 7C, if the present picture source is the DVD, the DVD is displayed in the 'A' region, and the source control information and the PIP control information shown in Table 1 of the DVD source control information is displayed in the 'B' region. As shown in FIG. 7D, if the present picture source is VIDEO, VIDEO is displayed in the 'A' region, and the source control information and the PIP control information shown in Table 1 of the VIDEO source control information is displayed in the 'B' region. As shown in FIG. 7E, if main/sub pictures are exchanged, to display a TV picture signal in a form of PIP, TV is displayed in the 'A' region, and the source control information and the PIP control information shown in Table 1 of the TV source control information is displayed in the 'B' region.

Figure 8:
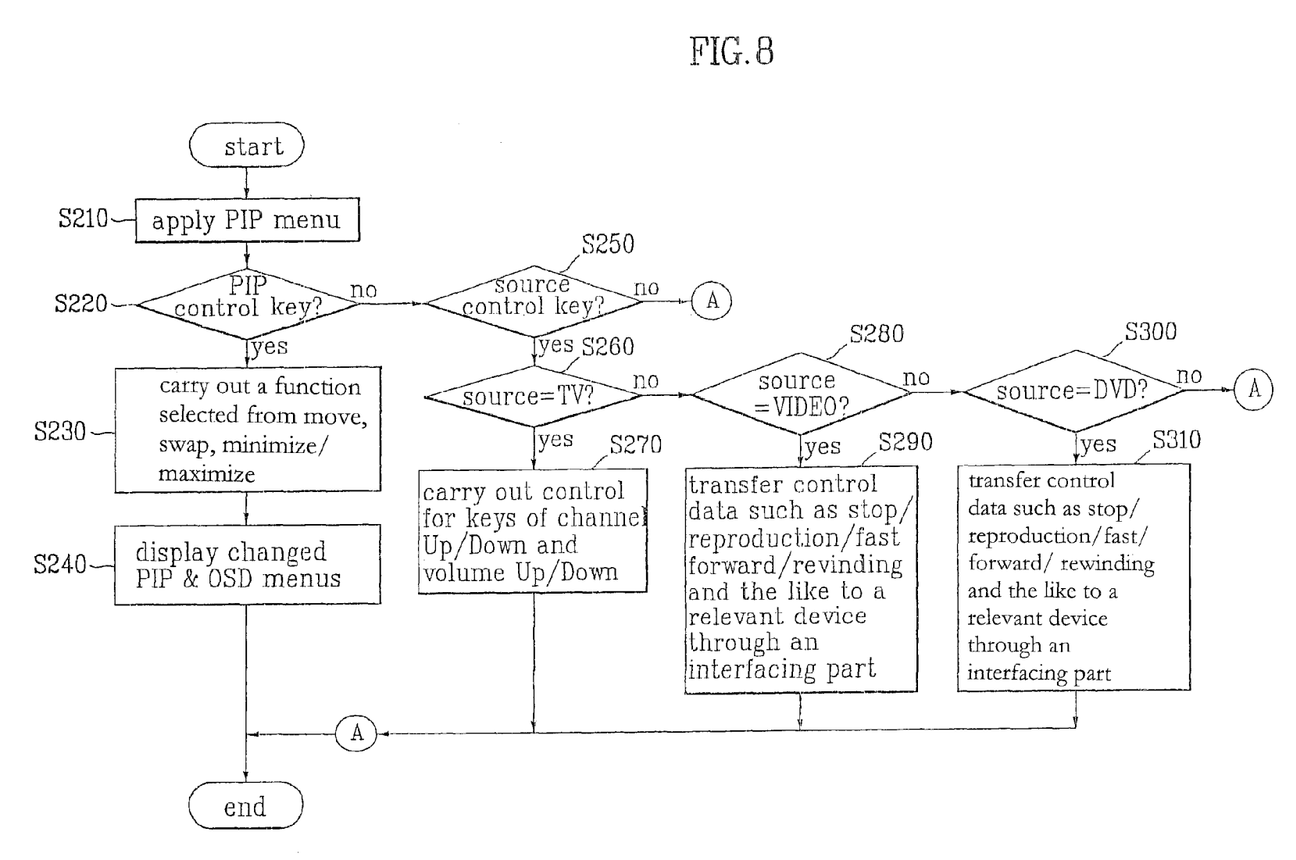
FIG. 8 illustrates a flow chart showing the steps of a method for displaying PIP on a TV in accordance with a preferred embodiment of the present invention in detail.

The method for displaying a PIP on a TV in accordance with a preferred embodiment of the present invention will be explained, with reference to FIG. 8

A PIP menu is received (S210). Reception of a PIP control key from the user is determined (S220). If the PIP control key is received from the user, control according to the PIP control command shown in FIG. 3 is carried out (S230). Then, changed PIP and menus are displayed (S240). If the PIP control key is not received from the user as a result of the determination (S220), receipt of the source control key is determined (S250). The source of being the TV is determined as a result of the determination (S260). If the source is TV as a result of the determination (S260), required control is carried out for the keys of the channel up/down, volume up/down, and the like depending on a received control command (S270). If the source is VIDEO as a result of the determination (S260), the source control functions of stop/reproduction/fast forward/rewinding shown in Table 1 are carried out (S280). If the source is DVD as a result of the determination (S260), the source control function like the function for controlling the VIDEO is carried out (S290).

As explained, if the user selects the PIP mode, and the PIP control key is selected from the displayed rim information, either the PIP is moved to a new location, exchange of the main/sub pictures are made, the PIP is minimized and displayed, or the PIP is maximized and displayed.

If the user selects a source control key, the received signal is determined of being a TV picture signal, a video signal, a DVD signal, and the source control function having the user applied thereto is carried out. That is, a control signal is transmitted to the external devices through the interfacing part 400 so that, if the determined source signal is a TV signal, one of functions such as channel up/down, volume up/down, and the like applied by the user which may be controlled while watching the TV is carried out, if the determined source signal is a video or a DVD, one of functions, such as stop, reproduction, fast forward, re-winding, and the like which may be controlled while watching the picture signal received through the video or DVD is carried out.

As has been explained, the device and method for displaying the PIP on a TV of the present invention have the following advantages.

First, the simultaneous movement of the PIP screen and the PIP menu can provide a variety for PIP window screens according to user's requirements.

Second, if the TV is used, with a variety of external devices connected thereto, the display of relevant source control information and PIP control information in a form of rim information permits the user to obtain desired information easily when the user identifies the picture source and selects the PIP.

Third, the control of the PIP according to user's requirements improves satisfaction of the user.

It will be apparent to those skilled in the art that various modifications and variations can be made in device and method for displaying a PIP on a TV of the present invention without departing from the spirit or scope of the invention. Thus, it is intended that the present invention cover the modifications and variations of this invention provided they come within the scope of the appended claims and their equivalents.

What is claimed is:

1. A device for displaying a picture-in-picture (PIP) signal received from at least one source of a digital television, the device comprising:
   a display;
   a rim information generator for generating rim information according to the at least one source and outputting the generated rim information as on-screen display (OSD) data for constructing a PIP menu corresponding to the at least one source, the output OSD data being displayed by said display in association with the received PIP signal; and
   a microcomputer for identifying the at least one source of the received PIP signal and for controlling, according to a user operation of the PIP menu, the display of the received PIP signal and a display of the generated rim information.

2. The device as claimed in claim 1, wherein the rim information includes source control information, specific to each of the at least one source, for enabling user control of a selective operation of the identified at least one source.

3. The device as claimed in claim 1, wherein the rim information includes PIP control information, specific to each of the at least one source, for enabling user control of a selective display of the PIP signal from the identified at least one source.

4. The device as claimed in claim 1, wherein said rim information generator accesses a prestored set of OSD data for each of the at least one source.

5. The device as claimed in claim 1, wherein the output OSD data constructs a frame region around the picture of the received PIP signal and wherein the PIP menu is displayed within the frame region.

6. The device as claimed in claim 1, wherein the output OSD data includes a source identifier to be displayed in the frame region.

7. The device as claimed in claim 1, wherein the PIP menu includes a set of selectable icons corresponding to the at least one source of the PIP signal.

8. The device as claimed in claim 7, wherein the selectable icons correspond to source control functions of at least one of channel up/down, volume up/down, stop, play, fast forward, and rewind.

9. The device as claimed in claim 7, wherein the selectable icons corresponds to PIP control functions of at least one of move, swap, minimize, and maximize.

10. The device as claimed in claim 1, wherein the at least one source of the PIP signal is a peripheral media device connected to the digital television.

11. The device as claimed in claim 10, further comprising:
    an interfacing circuit for interfacing between said microcomputer and the peripheral media device, to enable control of the peripheral media device according to the user operation of the PIP menu.

12. The device as claimed in claim 1, wherein the at least one source includes a main picture source and a sub picture source.

13. The device as claimed in claim 12, wherein the sub picture source is input from one of a plurality of peripheral media devices.

14. The device as claimed in claim 13, wherein the plurality of peripheral media devices includes a receiver of the digital television.

15. The device as claimed in claim 12, further comprising:
    a first picture processor for receiving and processing a first picture signal from a main picture source;
    a second picture processor for receiving and processing a second picture signal from a sub picture source;
    a superimposing circuit for superimposing picture signals from said first and second picture processors; and
    a switch for selectively outputting to said display the superimposed picture signal from said superimposing circuit and the rim information from said rim information generator.

16. A method for displaying a picture-in-picture (PIP) signal received from at least one source of a digital television, the method comprising:
    identifying the at least one source of the received PIP signal in response to a user selection of a PIP mode;
    generating, according to the identified at least one source, rim information as on-screen display (OSD) data for constructing a PIP menu for each of the at least one source;
    displaying the PIP signal of the identified at least one source and the corresponding rim information; and
    executing at least one of a PIP control function and a source function in response to a user operation of the PIP menu of the identified at least one source.

17. The method as claimed in claim 16, wherein the PIP control function includes one of move, swap, minimize, and maximize.

18. The method as claimed in claim 17, wherein the at least one source of the PIP signal is a peripheral media device connected to the digital television.

19. The method as claimed in claim 18, wherein the rim information is selected according to a type of the peripheral media device of the identified at least one source.

20. The method as claimed in claim 19, wherein the rim information includes first source control information for controlling operation of a receiver of the digital television and second source control information for controlling operation of the peripheral media device connected to the digital television.

21. The method as claimed in claim 20, further comprising:
    accessing a prestored set of OSD data to select one of the first and second source control information according to identified at least one source.

22. The method as claimed in claim 16, further comprising refreshing the display of the PIP signal of the identified at least one source according to said control function executing.

23. The method as claimed in claim 22, wherein the PIP menu of the corresponding rim information is displayed together with the refreshed display of the PIP signal.

24. The method as claimed in claim 16, wherein the source control function includes one of channel up/down, volume up/down, stop, play, fast forward, and rewind.

25. The method as claimed in claim 16, wherein the generated rim information is specific to each of the at least one source and includes source control information for enabling user control of a selective operation of the identified at least one source and PIP control information for enabling user control of a selective display of the PIP signal from the identified at least one source.

26. The method as claimed in claim 16, wherein the output OSD data constructs a frame region around the picture of the received PIP signal and wherein the PIP menu is displayed within the frame region.

27. The method as claimed in claim 26, wherein the output OSD data includes a source identifier to be displayed in the frame region.

28. The method as claimed in claim 16, wherein the PIP menu includes a set of selectable icons corresponding to the at least one source of the PIP signal.

29. The method as claimed in claim 28, wherein the selectable icons correspond to source control functions of at least one of channel up/down, volume up/down, stop, play, fast forward, and rewind.

30. The method as claimed in claim 28, wherein the selectable icons correspond to PIP control functions of at least one of move, swap, minimize, and maximize.

* * * * *